United States Patent [19]

Miyakawa et al.

[11] 4,144,639
[45] Mar. 20, 1979

[54] APPARATUS FOR FITTING FLEXIBLE ANNULAR PART AROUND AN ARTICLE

[75] Inventors: Seii Miyakawa; Naoki Takahashi, both of Yokohama, Japan

[73] Assignee: Hitachi, Ltd., Japan

[21] Appl. No.: 862,625

[22] Filed: Dec. 20, 1977

[30] Foreign Application Priority Data

Dec. 22, 1976 [JP] Japan .................. 51-153402
Jan. 28, 1977 [JP] Japan .................. 52-7726
Nov. 7, 1977 [JP] Japan .................. 52-132516
Mar. 2, 1977 [JP] Japan .................. 52-23952[U]
Jun. 20, 1977 [JP] Japan .................. 52-79708[U]

[51] Int. Cl.² .................. B23P 19/02; B23Q 7/10
[52] U.S. Cl. .................. 29/809; 29/235
[58] Field of Search .................. 29/235, 450, 797, 809, 29/816

[56] References Cited

U.S. PATENT DOCUMENTS

| 2,214,814 | 9/1940 | Hambleton | 29/809 X |
| 3,665,578 | 5/1972 | Jaquette | 29/235 X |
| 3,713,199 | 1/1973 | Jaquette | 29/235 X |
| 3,808,664 | 5/1974 | Jaquette | 29/235 |
| 3,851,369 | 12/1974 | Escholz | 29/235 X |
| 3,858,297 | 1/1975 | Scholin et al. | 29/797 X |

FOREIGN PATENT DOCUMENTS

627563  3/1936  Fed. Rep. of Germany ............. 29/235

Primary Examiner—E. M. Combs
Attorney, Agent, or Firm—Craig & Antonelli

[57] ABSTRACT

An apparatus for picking up one or several flexible annular parts such as an endless rubber belts from a random stack thereof, and for separating, during a conveyance of the picked up parts, into independent pieces. As the parts are successively conveyed to a feeding position a plurality of claws are inserted into the earliest part so as to stretch the part radially outwardly and hold the part in the stretched condition. The claws then convey the part to a fitting position with the claws then releasing the part from the stretched condition and transferring it to the article, thereby fitting the flexible annular part around the article.

6 Claims, 29 Drawing Figures

APPARATUS FOR FITTING FLEXIBLE ANNULAR PART AROUND AN ARTICLE

BACKGROUND OF THE INVENTION

The present invention relates to an apparatus for fitting and mounting a soft and flexible annular part such as an annular rubber belt or the like to or around an article such as an electronic appliance.

In general, a complicated procedure has to be taken for fitting and mounting annular flexible parts around an article. Thus, conventional fitting work, which has been done manually, is extremely inefficient and, moreover, involves such a substantial problem that the annular flexible material is inconveniently deformed by a large amount, due to the skill and other conditions of the workers, resulting in a deteriorated reliability of the assembled final product.

At the same time, flexible annular parts are usually purchased from the manufacturer by cartons in which the parts are accommodated in a random manner with the annular parts being twisted and entangled with one another thereby making it extremely difficult to transport the parts in separate condition.

Further, since these parts are made to have an annular shape and a flexible nature, they cannot have a stable form unless they are suitably stretched, and, therefore, are inconvenient to handle.

For these reasons, it is extremely difficult to automatically fit these flexible annular parts to electronic appliances having a torque transmission relying upon flexible annular power transmitting parts, e.g. tape recorders, stereophonic players and so on, so that a substantial problem has been raised during a mass-production of these appliances.

BRIEF SUMMARY OF THE INVENTION

It is therefore an object of the invention to provide an apparatus capable of fitting flexible annular parts stacked in a random manner, one by one, to a predetermining portion of an article without damaging the parts.

It is another object of the invention to provide an apparatus adapted to separate flexible annular parts stacked in a random manner into independent bodies, and to convey them one by one to a feeding section, thereby enhancing the feeding rate of the flexible annular parts so as to afford a high speed fitting of these parts to a predetermined portion of successive articles without incurring damages of these parts.

It is still another object of the invention to provide an apparatus for automatically fitting flexible annular parts to predetermined portion of successive articles, in which the flexible annular parts stacked in a random manner are separated into independent bodies and, during the transportation of the separated parts one by one, twisted flexible annular parts are conveniently detected and ejected.

To these ends, according to the invention, there is provided an apparatus for automatically fitting flexible annular parts onto successive articles characterized in that a rotary hollow drum adapted to be intermittently rotated, is provided with a plurality of pins on the inner peripheral wall thereof with the pins extending and projecting in the direction of rotation of the drum. A number of flexible annular parts stacked in a random manner on a bottom of the drum and are picked up one by one and conveyed by the successive pins as the drum is rotated. The flexible annular parts thus conveyed upward are then successively transferred to a claw having end which projects a part into conveyance passage located at an upper section of the drum. The claw is then suitably moved to deliver the flexible annular parts onto a support plate located at a feeding position. Then, the flexible annular parts are stretched radially outwardly by a plurality of claws on a chuck and delivered to a fitting position, where they are released and fitted around the article.

In another aspect of the invention, an apparatus is provided for automatically fitting flexible annular parts onto successive articles, wherein one or a plurality of annular flexible parts stacked at random on the bottom of an intermittently rotatable hollow drum, are picked up and conveyed to an upper section of the drum by a plurality of pins are formed on the inner peripheral wall of the drum and project in a direction of rotation of the drum. The flexible annular parts are then delivered onto one end of a shaft having a spiral groove which has a width for receiving one flexible annular part. As the shaft is rotated, the parts are successively conveyed along the spiral groove from one end of the shaft to the other end thereof. During the conveyance along the shaft, the parts are separated into independent bodies. The parts are then successively dropped, one by one, from the other end of the shaft onto claws stationed at the other end of the shaft. The flexible annular parts are then delivered, assuming a horizontal posture, by the claws onto a supporting plate located at the feeding position. The parts held by the supporting plate, are then stretched radially outwardly by a plurality of claws of a chuck and conveyed to a fitting position where they are released and fitted around the article.

According to still another aspect of the invention, there is provided an apparatus for fitting flexible annular parts to successive articles in which one or a plurality of flexible annular parts, stacked at random on the bottom of an intermittently rotatable drum, are successively picked up by pins provided on the inner periphery of the drum and conveyed to an upper position of the drum as the latter is rotated. Then, the flexible annular parts are transferred to one end of a shaft which has been stationed at the upper position of the drum and having a spiral groove of a width just to receive one flexible annular part. As the shaft is rotated, the flexible annular parts are conveyed along the spiral groove from one end to the other end of the shaft. During this conveyance, the flexible annular parts are separated into independent bodies and are then dropped one by one from the other end of the shaft onto claws which stationed at the other end of the shaft. These claws then shift the successive flexible annular parts to a twist-detecting position where the flexible annular parts are examined for any twisting, and twisted parts, if any, are ejected. The flexible annular parts which are not twisted and have the correct posture are then transported from the twist-detecting position to a feeding position by means of another set of claws and delivered to a supporting plate situated at the feeding position, so as to assume a horizontal posture. The flexible annular parts, held by the supporting plate, are then stretched radially outwardly and held by claws of a chuck and conveyed to a fitting position, where they are released and fitted around the objective article.

These and other objects, as well as advantageous features of the invention will become clear from the following description of the preferred embodiments taken in conjunction with the attached drawings.

DETAILED DESCRIPTION OF THE PREFERRED EMBODIMENTS

Hereinafter, description will be made as to preferred embodiments of the invention with reference to the accompanying drawings.

Referring first to FIGS. 1 to 14 showing a first embodiment of the invention, there is shown an apparatus generally designated by the reference numeral 31' for fitting successive one of flexible annular parts such as flexible rubber belts 28 (referred to simply as belt, hereinafter) around a driving pulley 29 and a driven pulley 30 of successive articles 27 stationed at a predetermined position. The apparatus 31' has a supplying means generally designated by the reference numeral 33 adapted to temporarily store a large number of belts 28 supplied thereto in a random manner, and to deliver batches of belts 28 successively, separating means generally designated by the reference numeral 34 adapted to separate the batch of belts delivered from the supplying means into independent belts, guide means generally designated by the reference numeral 36' adapted to receive the separated belts 28 and shifting the same to a feeding position, a chuck generally designated by the reference numeral 37 adapted to stretch and hold the belts arriving at the feeding position and to release the belts 28 at a fitting position thereby to fit the belt 28 around the pulleys 29, 30 of the article 27, a pick-and-place unit generally designated by the reference numeral 38 adapted to reciprocatorily move the chuck 37 between the feeding position and the fitting position along a predetermined path, and conveying means generally designated by the reference numeral 39 adapted to convey the article 27 along a predetermined path and locate the same at the predetermined fitting position.

Figure 1:
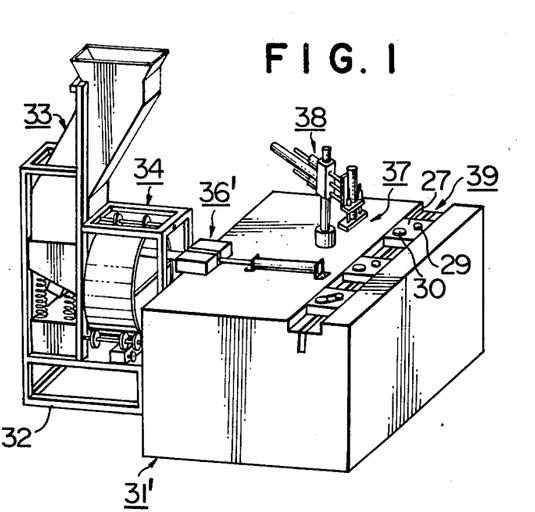
FIG. 1 is a general perspective view showing the whole structure of a fitting apparatus of a first embodiment of the invention.
Figure 2:
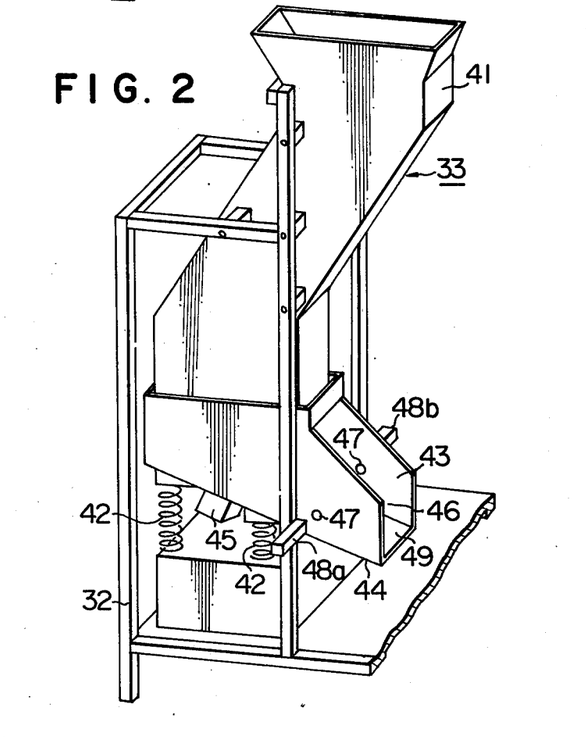
FIG. 2 is a general perspective view of a supplying means.

The supplying means 33 has, as shown in FIG. 2, a hopper 41 carried by a frame 32 of the apparatus 31', a chute 43 carried through a plurality of springs 42 by the frame 32 for free vibration and disposed beneath the hopper 41 so as to receive the belts 28 fed to the hopper 41, a vibrator 45 secured to the back side of the chute 43 for imparting a vibration to the latter so as to discharge the belts 28 on the chute 43 by the vibration, and a first sensor generally designated by the reference numeral 48 including a light emitting device 48a and a light receiving device 48b held by the frame 32 and confronting each other through a small light-transmitting bore 47 formed in the vicinity of an outlet port 46 of the chute 43, the first sensor 48 being adapted to produce an alarm signal when it fails to sense belts 28 at the outlet of the chute 43.

The bottom wall 49 of the chute 43 is inclined at such a small angle so as not to allow the belts 28 fed into the hopper 41 and stacking at the bottom wall 49 to slide down due to their weights.

Figure 3:
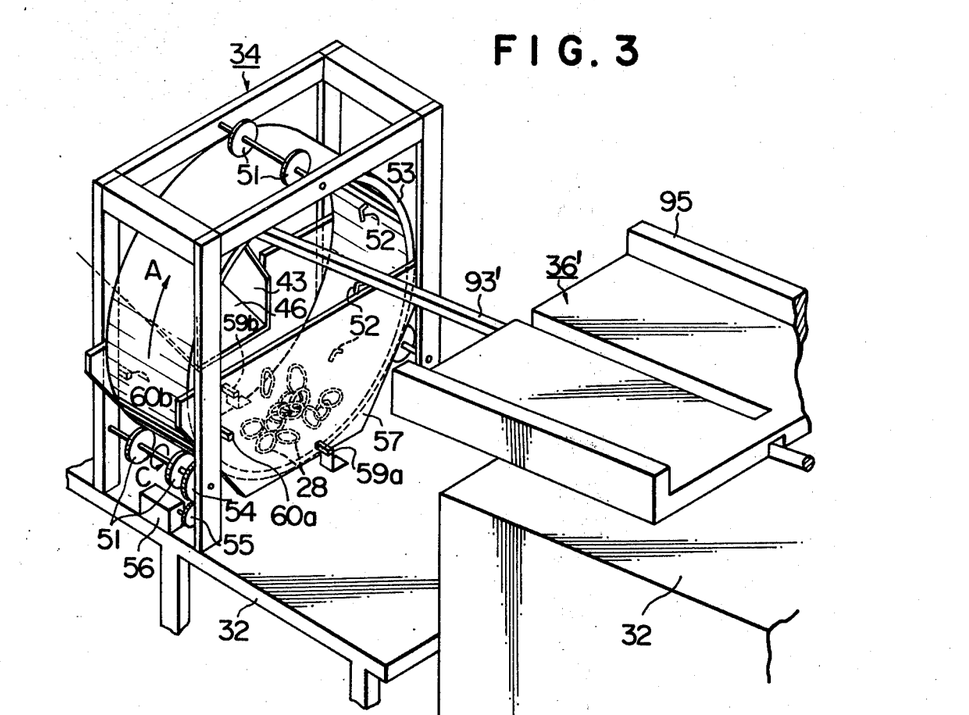
FIG. 3 is a general perspective view of a separating means and a guiding means.
Figure 4:
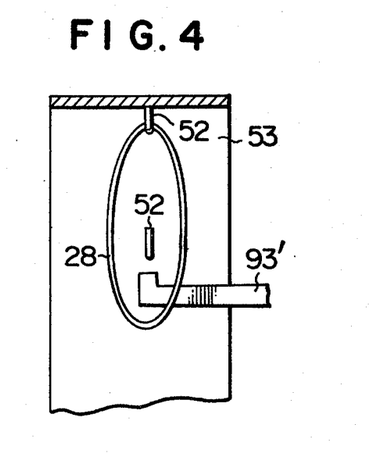
FIG. 4 is a side elevational view of a part of the apparatus as shown in FIG. 1, showing the manner of delivery of a belt from the separating means to the guiding means.
Figure 5:
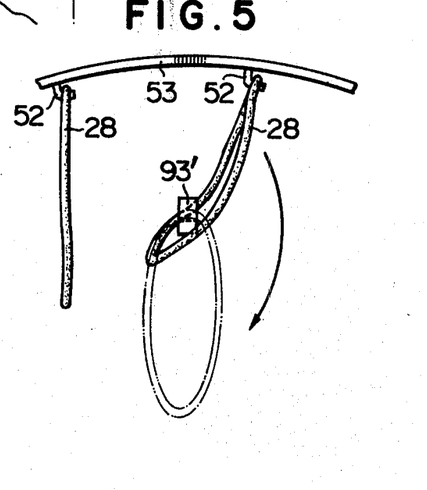
FIG. 5 is a sectional front elevational view of the part of apparatus as shown in FIG. 4.

The separating means 34 includes, as shown in FIGS. 3 to 5, a hollow drum 53 rotatably carried by three rollers 51 are rotatably mounted on the frame 32 of the apparatus 31'. A plurality of equal spaced pins 52 are provided along an inner peripheral wall of the hollow drum 53 and project in the direction of rotation of the drum 53, so as to pick up and separate one or a batch of belts 28 from the stack of the belts 28 on the bottom of the drum 53, an electric motor 56 adapted to rotate one of the rollers 51 in the direction of the arrow designated C, thereby to drive the drum 53 in the direction of arrow A, a pair of transparent covers 57, 58 carried by the frame and in contact with respective ends of the drum 53, so as to prevent the belts 28 supplied to the drum from dropping out of the latter, a second sensor generally designated by the reference numeral 59 consisting of a light emitting device 59a and a light receiving device 59b which are carried by the frame 32 so as to oppose each other through the lower portions of the covers, thereby to detect the shortage of the belts 28 in the drum, and a third sensor generally designated by the reference numeral 60 adapted to detect that a sufficient amount of belts 28 have been fed into the drum 53 and consisting of a light emitting device 60a and a light receiving device 60b which are supported also by the frame 32 and confront each other through the transparent covers 57, 58 at a height corresponding to the stack height of the predetermined amount of belts 28.

The outlet 46 of the chute 43 extends through the cover 58 into the drum 53.

The arrangement is such that the vibrator 45 of the supplying means 33 is started, as the shortage of the belts 28 in the drum 53 is detected by the second sensor 59, so that the belts may be supplied from the chute 43 into the drum 53. The vibrator 45 is stopped when the required amount of the belts 28 have been supplied and detected by the third sensor 60, so that the further supply of the belts 28 is interrupted.

As shown in FIGS. 3 to 5, the guiding means 36' includes a supporting plate 95 which is fixed at a belt feeding position on the frame 32 of the fitting apparatus 31', a claw 93' slidably mounted across the supporting plate 95 and adapted to be moved into the path of belts 28, which have been picked up by the pins 52 and separated into independent belts by virtue of the rotation of the drum 53, in such a manner that the end of the claw 93' is projected into the drum 53 and positioned at the center of the belt 28, and a pneumatic cylinder 100' (referred to simply as a cylinder, hereinafter) adapted to cause the reciprocating movement of the claw 93' between the drum 53 and the supporting plate 95.

The guiding means 36' is thus constructed and adapted to shift those belts 28 which have been separated into independent belts by the separating means into the feeding position.

As will be seen from FIGS. 6 through 12, the chuck 37 includes a base 121 carrying at its upper surface with a predetermined space from the latter a pair of guides 131, and having bores 125, 126 for supporting a pair of rocking arms, a bore 127 for supporting a rotary arm and a bore 130 along which a pair of levers for driving the rocking arms, a slider 132 slidably cramped between the guides 131 and the base 121 and having a pair of elongated bores 133, 134 for transmitting a driving power to the pair of rocking arms, a rocking arm 122 carried rotatably by the base 121 with a pin 135 provided at its one end rotatably received by the bore 125 of the base 121 and having at its intermediate portion a lever 128 slidably received by the elongated bore 133 of the slider 132, another rocking arm 123 carried rotatably by the base 121 with a spacer interposed therebetween, with a pin 135' provided at its one end rotatably received by the bore 126 of the base 121 and having a lever 129 provided at its intermediate portion slidably received by the elongated bore 134 of the slider 132, claws 141, 142 rotatably carried, through bearings 140, by respective pins 138, 139 formed at the free ends of the rocking arms 122, 123, a rotary arm 124 rotatably supported through a bearing (not shown) by the bore 127 of the base 121, a pair of claws rotatably carried by one end of the rotary arm 124 through respective bearings 143, a pinion 145 fixed to the other end of the rotary arm 124, a rack 146 fixed to one end of the slider 132 for engagement with the pinion 145, a pneumatic cylinder 147 (referred to simply as a cylinder, hereinafter) having one end fixed through a fixture 148 to the base 121 and provided with a cylinder rod 149 the end of which being connected through a fixing plate 150 to the slider, and an adapter plate 151 secured to the base 121 and adapted to fix the chuck 37 to a pick-and-place unit 38 for conveying the chuck 37.

Figure 6:
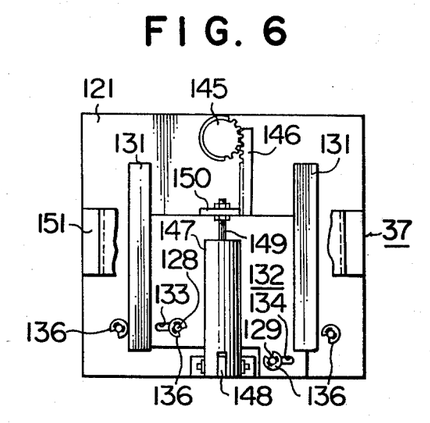
FIG. 6 is a sectional plan view of a chuck.
Figure 7:
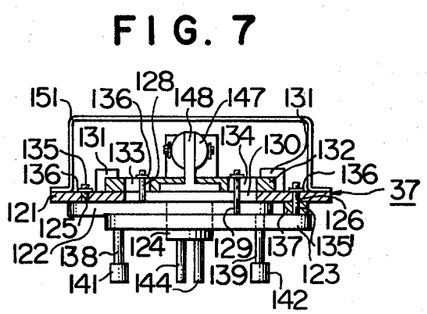
FIG. 7 is a front elevational view of the chuck.
Figure 8:
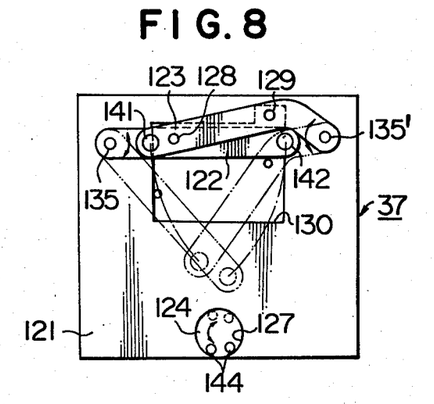
FIG. 8 is a bottom plan view of the chuck.
Figure 9:
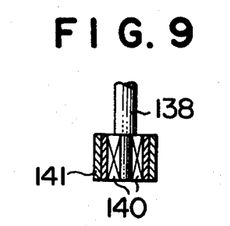
FIG. 9 is a sectional front elevational view of the chuck.
Figure 10:
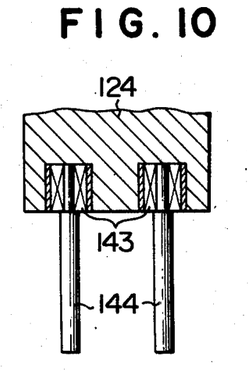
FIG. 10 is a sectional front elevational view of a rotary arm and claws.
Figure 11:
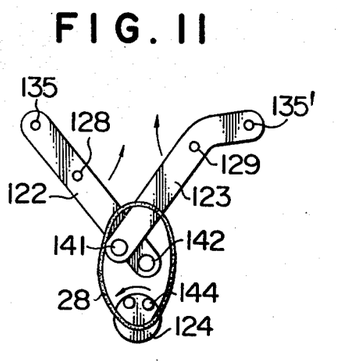
FIG. 11 is an illustration explanatory of the manner in which the belts are held by the chuck.
Figure 12:
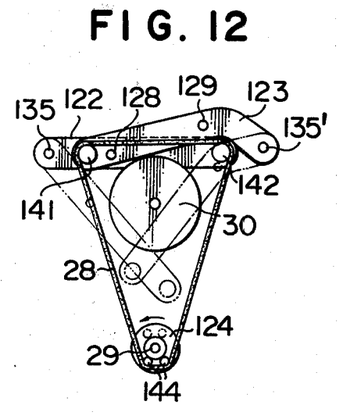
FIG. 12 is an illustration explanatory of the manner in which the belts are fitted.
Figure 13:
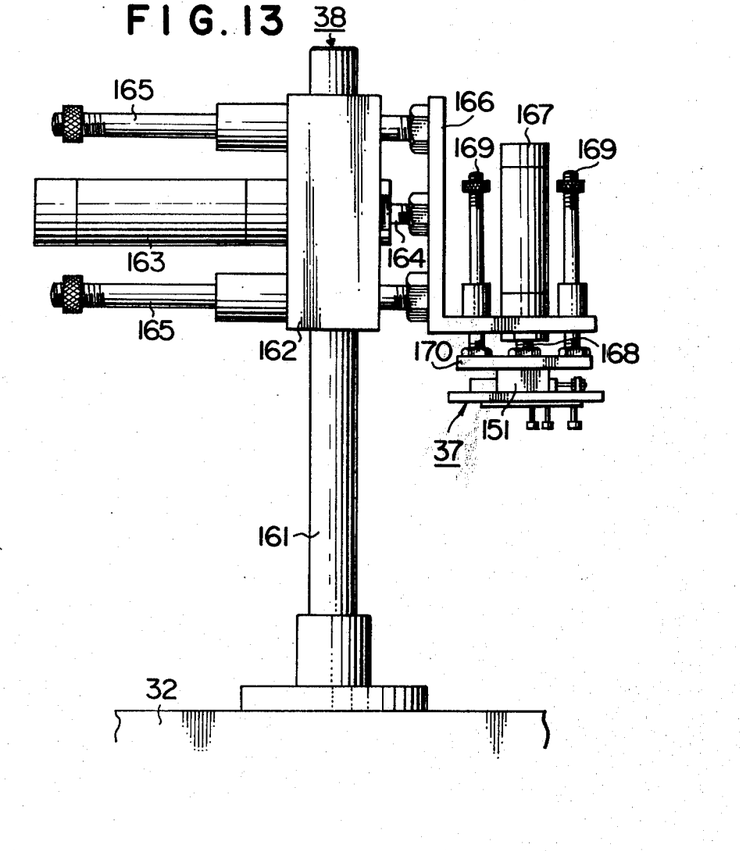
FIG. 13 is a side elevational view of a pick-and-place unit.

In order to prevent the rocking arms 122, 123 from dropping out of the base 121 and the slider 132, rings 136 are fitted around the pins 135, 135' and the levers 128, 129.

The pick-and-place unit 38 is adapted to convey the chuck 37 along an inversed U-shaped path of travel to a fitting position, thereby to transport the belts 28 to the fitting position where the article 27 to be fitted with the belt 28 has been stationed. As will be seen from FIG. 13, the pick-and-place unit 38 has a base 162 displaceably fitted and secured to a guide post 161 which, in turn, is fixed to the frame 32 of the apparatus 31', a pneumatic cylinder 163 (referred to simply as a cylinder, hereinafter) fixed to the base 162 with its axis disposed horizontally and having a cylinder rod 164 adapted to slidably pass through the base 162, a pair of guides 165 passing horizontally through the base 162 slidably and installed to extend in parallel with the cylinder rod 164, a generally L-shaped movable base 166 secured to the ends of the cylinder rod 164 and the guide bars 165, so as to be reciprocatorily moved between the belt feeding position and the belt fitting position upon actuation of the cylinder 163, a pneumatic cylinder 167 (referred to simply as a cylinder, hereinafter) fixed to the base 166 with its axis laid perpendicular to the latter and having a cylinder rod 168 slidably passing through the movable base 166, a pair of guide bars 169 extending in parallel with the cylinder 167 and passing slidably through the movable base 166 perpendicularly thereto, and an adapter plate 170 to which the chuck 37 is secured and, the adapter plate in turn being secured to respective ends of the cylinder rod 168 and the guide bars 169.

Figure 14:
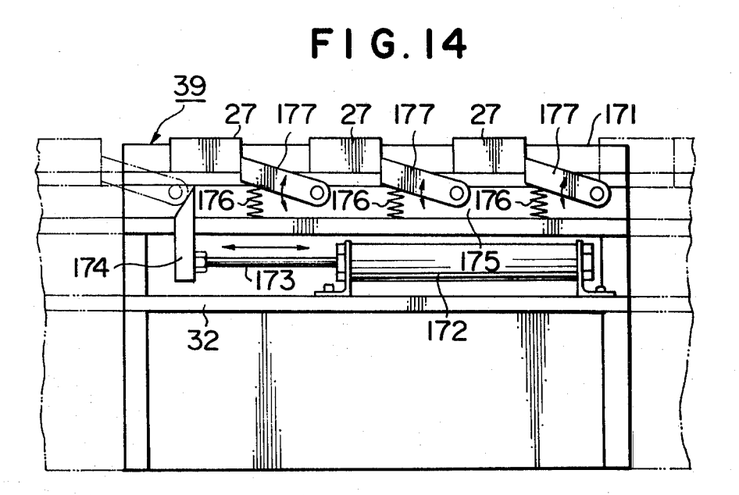
FIG. 14 is a sectional front elevational view of a conveying means.

The conveying means 39 is adapted to intermittently convey the articles 27 to the belt fitting position and includes, as shown in FIG. 14, a pair of guide rails 71 fixedly mounted on the frame 32 of the fitting apparatus 31', pneumatic cylinder 172 (referred to simply as cylinder, hereinafter) fixed to the frame 32, a slider 175 connected through a connector 174 to a cylinder rod 173 of the cylinder 172, and feeding claws 177 suitably spaced by a predetermined distance from adjacent ones and rotatably carried by the slider 175, and biased to project toward the opposing surfaces of the rails 171 by means of springs 176.

The resilient force of springs 176 biasing the feeding claws 177 are so adjusted that the feeding claws 177 are projected into the space between the rails 171 during feeding of the article 27, and that the feeding claws 177 are moved beneath the articles 27 when the slider 175 makes a returning stroke.

In operation, the belts 28 fed into the hopper 41 through the opening at the top of the latter are stacked on the chute 43 laid at the lower end of the hopper 41. As the vibrator 45 is started by the signal generated by the second sensor 59, the chute 43 is vibrated to allow the belts 28 to slide along the bottom wall 49 of the chute 43 down into the drum 53. The belts 28 are then stacked on the bottom of the drum 53. The drum 53 is rotated by the roller 51 which is driven through gears 54, 55 from the motor 56. One or several belts 28 are picked up by successive pins 52 formed on the inner peripheral wall of the drum 53 from the stack of the belts and moved upward away from the other belts 28 in the stack toward the upper portion of the drum 53.

The belt 28, which has been conveyed to the upper portion of the drum 53, is then engaged by the claw 93' which has been projected into the path of conveyance of the belts 28. As the drum 53 is further rotated, the belt 28 comes to be disengaged from the associated pin 52 and dropped, so as to be retained by the claw 93'. Then, the cylinder 100 is energized to shift the claw 93' to the feeding position, so as to transfer the belt 28 onto the supporting plate 95. As the belt 28 is transferred onto the supporting plate 95, the cylinder 167 of the pick-and-place unit 38 is actuated so as to lower the chuck 37, which has been stationed above the supporting plate 95 being carried by the adapter plate 170, until the claws 141, 142, 144 of the chuck 37 come into contact with the supporting plate 95. As the claws 141, 142, 144 of the chuck 37 come to contact the supporting plate 95, the cylinder 147 is energized to extend its cylinder rod 149 therefrom, so as to move the slider 132, through the fixing plate 150, toward the rotary arm 124.

As a result of the movement of the slider 132, the rocking arms 122, 123 are rotated, through the levers 128, 129, around the pins 135, 135', in the direction to stretch the belt 28. At the same time, the pinion 145 is rotated through the rack 146 fixed to the slider 132, to thereby rotate the rotary arm 124 in a direction so as to stretch the belt 28. Then, the claws 141, 142, 144 hold, by means of the respective rocking arms 122, 123 and the rotary arm 124, the belt 28 from the inside of the latter, so as to stretch the same radially outwardly.

In this state, since the claws 141, 142, 144 are rotatably supported through respective bearings 140, 143 by the arms 122, 123, 124, they can hold the belt 28 in such a manner that the tension in the belt 28 is uniformly distributed over the entire circumference of the belt 28. As the belt 28 is held by the chuck 37 in the above described manner, the cylinder 167 is reversed to move the chuck 37 above the supporting plate 95. As the chuck 37 has been moved up to an uppermost position in its stroke, the cylinder 163 is energized to move the chuck 37 to a position above the fitting position. Meanwhile, the article 27 to which the belt 28 is to be fitted has been conveyed by the feeding claw 177, along the rail 171, and located at the predetermined position waiting for the arrival of the belt 28 at the fitting position.

As the chuck 37 has arrived at the position above the fitting position, the cylinder 147 is energized to lower the chuck 37 until the belt 28 held by the same comes to assume the position confronting the peripheral surfaces of the driving and driven pulleys 29, 30 of the article 27. As the chuck 37 is lowered to that position and stopped, the cylinder 147 of the chuck 37 is again actuated to retract its cylinder rod 149 into the cylinder 147, thereby to pull back the slider 132 through the fixing plate 150. Then, through the pair of the levers 128, 129, the rocking arms 122, 123 are rotated toward the center of the belt 28, while the rotary arm 144 is rotated also toward the center of the belt 28 by the rack and pinion 146, 145, so that the claws 141, 142, 144 are moved toward the space between the driving and driven pulleys 29, 30. Consequently, the belt 28 comes to be retained by the peripheries of these pulleys 29, 30 and, therefore "fitted" around the article 27. During this transfer of the belt 28 from the claws 141, 142, 144, no irregular nor uneven tension is applied to the belt 28, so as not to cause a deformation of the belt 28, because the claws 141, 142, 144 are suitably rotated to release local tensions.

After fitting the belt 28 around the article 27, the cylinder 147 is reversed to lift the chuck 37 up to the position above the fitting position.

Subsequently, the cylinder 163 is actuated to bring the chuck 37 back to the position above the supporting plate 95, i.e. above the feeding position. Meanwhile, the article 27 to which the belt 28 has been fitted is forwarded to the next step of process, by the feeding claws 177 moved through the connector 174 and the slider 175 by the cylinder rod 173 projected from the cylinder 170, as the latter is actuated.

After conveying the article 27 by a predetermined distance of travel, the cylinder 172 retracts the cylinder rod 173 into the cylinder 172, thereby to return the slider 175 back to the starting position. It will be seen that the feeding claws abutting the article 27 during the returning movement are depressed downward, against the biasing force of the spring 167, so as not to displace the articles 27.

Thus, the belts 28 are successively fitted onto the articles, one by one, as the above stated procedure is repeated.

Hereinafter, another embodiment of the invention adapted for a higher feeding rate of the belts 28, and capable of rejecting twisted belts to fit only non-twisted belts 28 to the article 27 will be described with reference to FIGS. 2 and 6 through 29.

Figure 15:
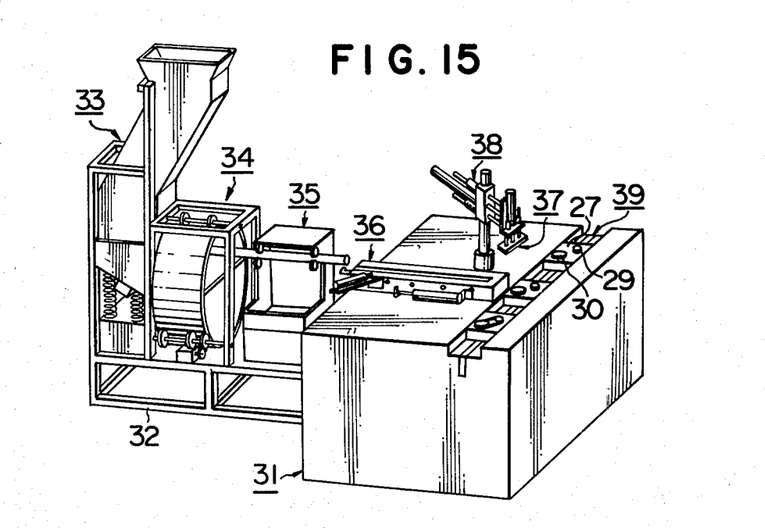
FIG. 15 is a general perspective view of a fitting apparatus of another embodiment.

FIG. 15 is a general view of the whole apparatus of this embodiment.

As shown in FIG. 15, a fitting apparatus generally designated by the reference numeral 31 includes a supplying means 33 adapted to be supplied with a large amount of belts 28 in a random manner and store them temporarily, the supplying means 33 being further adapted to suitably discharge required amount of belts 28, separating means 34 adapted to separate and pick up one or several belts from the stack of the belt 28 supplied by the supplying means 33, shifting means generally designated by the reference numeral 35 adapted to further separate the belts 28 separated by the separating means 34 into independent belts 28 and shift them one by one, means generally designated by the reference numeral 36 for ejecting twisted belt adapted to receive the belts 28 dropped off from the end of the shifting means 35 and intermittently shifting the belt to a feeding position, the twisted belt ejecting means further adapted to detect the twisting of the belt 28 and eject the twisted belt 28, if any, during the shifting to the feeding position, a chuck 37 adapted to stretch radially outwardly and hold the belt 28, which has been shifted to the feeding position, and to fit it at the fitting position around the two pulleys 29, 30 of the article 27, a pick-and-place unit 38 adapted for reciprocatorily moving the chuck 37 between the feeding position and the fitting position, and conveying means 39 adapted to convey the article 27 along a predetermined path and to locate it at the predetermined fitting position.

The shifting means 34 are adapted to receive at its one end the one or several belts 28, which have been separated from the stack of the belts 28 by the separating means 34, and array them one by one during shifting them to the other end thereof. More specifically, the shifting means includes, as shown in FIGS. 16 through 20, inclusive, a base 61 mounted on the frame 32 of the fitting machine 31, two sets of rollers 62 each of which consist of three rollers mounted on the base 61, a shaft 66 carried by the rollers rotatably in such a position that the discharging side end of the shaft 66 is positioned higher than the receiving side end of the same, a motor 63 carried by the base 61 and adapted to drive at least one of the rollers 62, two annular grooves 64 formed on the shaft 66 for contact with respective one of two sets of rollers 62, i.e. one groove 64 for one set 62 of rollers, a spiral groove 65 formed on the shaft 66 and adapted to shift the belts 28 therealong, the belt-receiving end of the shaft 66 projecting into the passage of the belts 28 separated from the stack and being conveyed by the pin 52 within the drum 53, and a fourth sensor generally designated by the reference numeral 67 consisting of a light emitting device 67a and a light receiving device 67b which are disposed at the discharging side end of the shaft 66, so as to confront each other through a passage of the belt 28 shifted to the end along the shaft 66, thereby to detect the arrival of the belt 28 at the discharging side end of the shaft 66 to produce a signal for stopping the motor 63.

Figures 16, 17, 18:
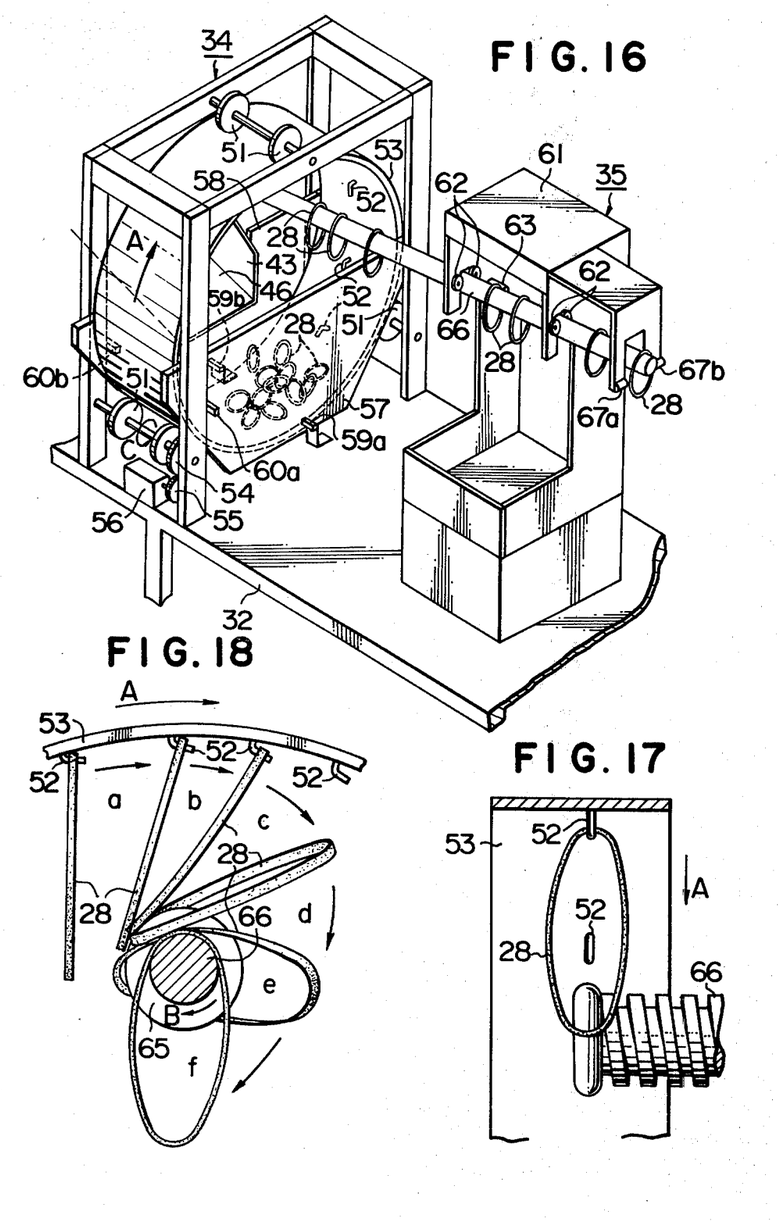
FIG. 16 is a general perspective view of a separating means and a shifting means.
FIG. 17 is a sectional side elevational view of the apparatus as shown in FIG. 15, showing the manner of delivery from the separating means to the shifting means.
FIG. 18 is a sectional front elevational view of the part of apparatus as shown in FIG. 17.
Figure 19:
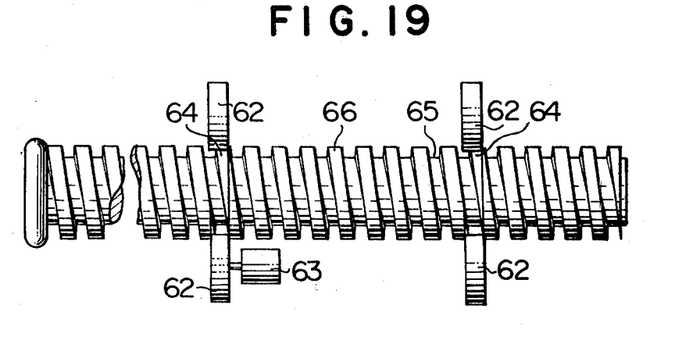
FIG. 19 is a plan view of the shifting means, showing the manner in which a shaft is supported.
Figures 20, 21:
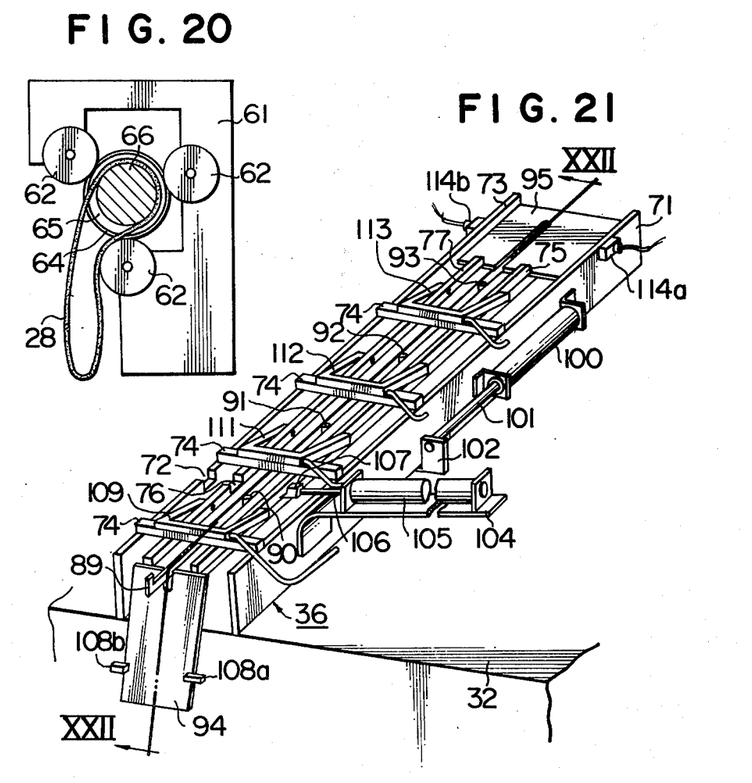
FIG. 20 is a front elevational sectional view of the shifting device while it is working for shifting the belts.
FIG. 21 is a general perspective view of means for ejecting and removing twisted belts.
Figure 22:
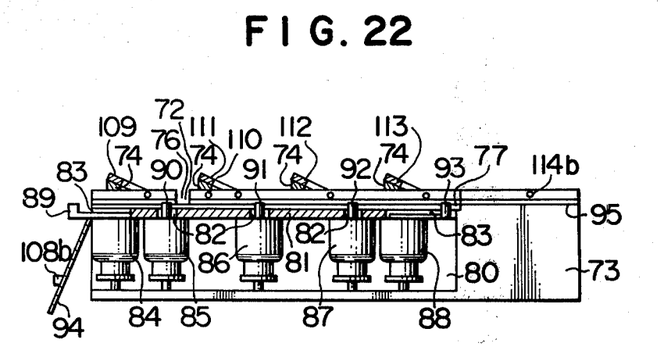
FIG. 22 is a sectional view taken along the line B-B' of FIG. 21.
Figure 23:
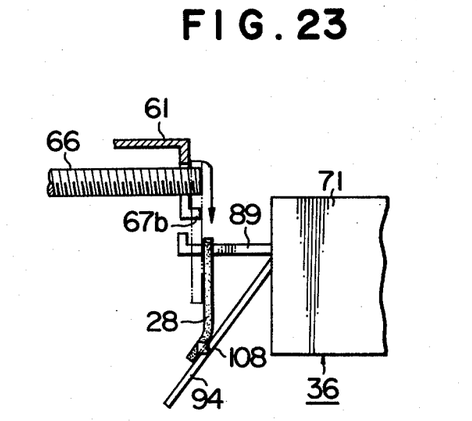
FIG. 23 is a sectional side elevational view of a part of apparatus, showing the manner of delivery of the belts from the shifting means to the means for ejecting twisted belts.
Figure 24:
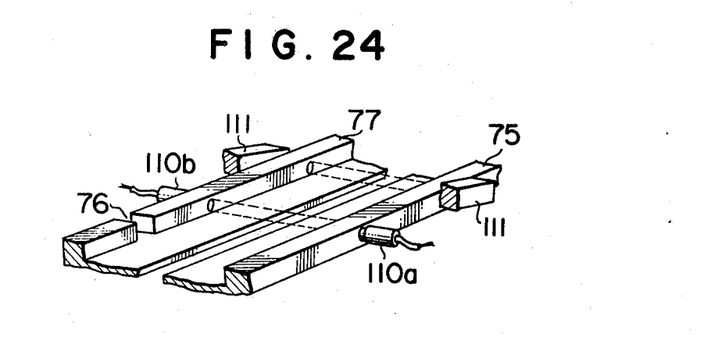
FIG. 24 is an enlarged perspective view of essential part of a sensor adapted for detecting the twisting of the belts.
Figure 25:
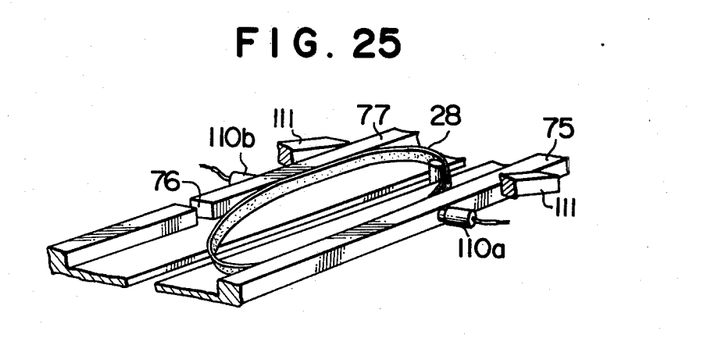
FIG. 25 is a perspective view of the sensor as shown in FIG. 24 with a belts which is not twisted.
Figure 26:
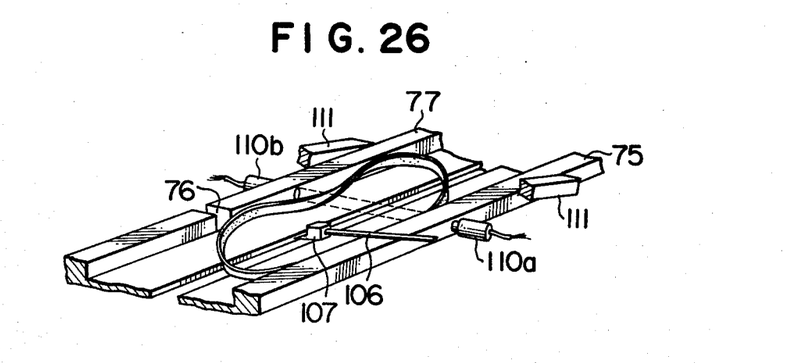
FIG. 26 is a perspective view of the sensor as shown in FIG. 24 with a twisted belt supplied thereto, and FIGS. 27 to 29 inclusive are sectional front elevational view of an ejecting means at respective steps of operation for ejecting twisted belts.
Figure 27:
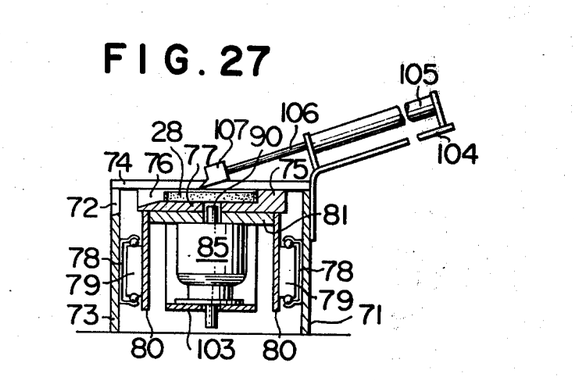
Figure 28:
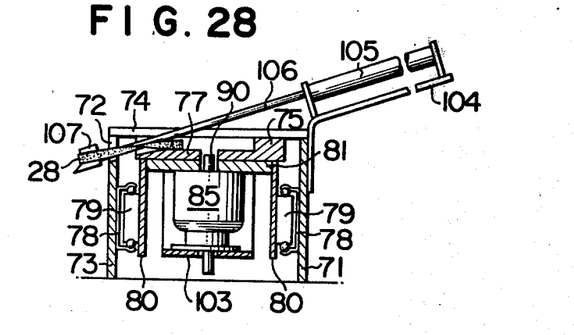
Figure 29:
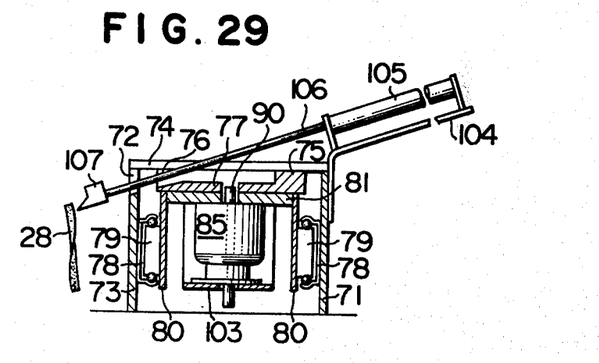

The spiral groove 65 has a width for receiving only one belt 28. A flange-shaped enlarged portion is formed at the receiving side end of the shaft 66, and is disposed in such a manner that the lower end of the belt 28 comes to contact the enlarged portion at a portion of the latter below the center of the same.

The shaft 66 is adapted to be rotated in the same direction B as the direction A of the drum 53 at a peripheral speed which is larger than that of the latter, so that the lower end of the belt 28 is moved along the shaft 66, when the lower end of the belt on the pin 52 is brought into contact with the enlarged portion of the shaft 66, so as not to cause a tension in the belt 28, thereby to facilitate the disengagement of the belt 28 from the pin 52.

The twisted-belt ejecting means 36 is adapted to deliver only non-twisted belt 28 to the feeding position, upon examining the presence of twist in the belt 28 shifted to and placed at the discharge side end of the shifting means 34.

More specifically, the twisted belt ejecting means 36 includes, as shown in FIGS. 21 through 29, a frame 71 mounted on the frame 32 of the fitting apparatus 31, a frame 73 having at a predetermined portion thereof a notch 72 for ejecting the belt 28, four battens 74 adapted to fix the frames 71, 73 in parallel relationship with each other, a rail 75 supported by the battens 74 and disposed to extend in parallel with the frame 71 within the space between the frames 71 and 73, a rail 77 held suitably spaced from and in parallel with the rail 75 by the batten 74 and having a notch 76 for ejecting the belts 28 corresponding to the notch 72, a pair of guides provided at opposing surfaces of the frames 71 and 73, a pair of side plates 80 carrying a plurality of rollers 79 engaging respective one of the pair of guides 78 and slidable in the direction in parallel with the frames 71, 73, a slide base fixed between the side plates 80 and provided with grooves 83 formed at the ends thereof, as well as a plurality of small bores 82 formed at a predetermined constant pitch, solenoids 84, 85, 86, 87 and 88 fixed to predetermined positions on the slide base, claws 89, 90, 91, 92 and 93 adapted to be projected to the guide surfaces of the rails 75, 76, through the small bores 82 or grooves 83, upon energization of the solenoids 84 to 88, so as to shift the belt 28, wherein one claw 89 of the claws 89–92 being adapted to be projected, when the belt 28 arrives at the discharging side end of said shaft 66, into the circle of the belt 28, a guiding plate 94 adapted to guide the belt 28 when the latter is lifted up to the guiding surfaces of the rails 75, 77 by the movement of the claw 89, after having been dropped off from the discharging side end of the shaft 66, a supporting plate fixed between the frames 71, 73 so as to support the belt 28 at the feeding position and provided with a grooves through which the claws are to be passed, a pneumatic cylinder 100 (referred to simply as cylinder, hereinafter) fixed to the outer side surface of the frame 71, a connecting plate 102 secured to the end of the cylinder rod 101 of the cylinder 100, a fixture 103 secured to the lower surface of the slide base 81 and connected to the connecting plate 102, a pneumatic cylinder 105 (referred to simply as cylinder, hereinafter) supported on the frame 71 through a fixture 104 and positioned to oppose to the notches 72 and 76 of the frame 73 and the rail 77, a claw 107 for ejecting the belt 28 and secured to the end of the cylinder rod 106 of the cylinder 105, a fifth sensor generally designated by the reference numeral 108 consisting of a light emitting device 108a and a light receiving device 108b fixed to a predetermined portion of the guiding plate 94 so as to confront each other, thereby to detect that the belt 28 is entrapped and retained by the claw 89, a sixth sensor generally designated by the reference numeral 109 having a light emitting device (not shown) and a light receiving device 109b disposed along the rails 75, 76, and adapted to detect the belt 28 having been fed by the claw 89, a seventh sensor generally designated by the reference numeral 110 (FIG. 22) having a light emitting device 110a and a light receiving device 110b (FIGS. 24–26) disposed across the rails 75, 77, in front of the sixth sensor 109, and adapted to detect the twist of the belt 28 if any, an eighth sensor generally designated by the reference numeral 111 having a light emitting device 111a and a light receiving device 111b fixed across the rails 75, 77 to confront each other, at the end of the travel of the belt 28 by the claw 90, and adapted to detect the presence of the belt at the end of the stroke, a ninth sensor generally designated by the reference numeral 112 and a tenth sensor generally designated by the reference numeral 113 having respective light emitting devices (not shown) and light receiving devices 113b disposed across the rails 75, 77 to confront each other, at the ends of strokes of travel of belt by the claws 91 and 92, and adapted for detecting the presence of the belt 28 at these ends of strokes, and an eleventh sensor generally designated by the reference numeral 114 having a light emitting device 114a and a light receiving device 114b disposed across the frames 71, 73 to confront each other, at the end of the travel of the belt 28 by the claw 93, and adapted for detecting the presence of the belt at the end of the travel.

As the eleventh sensor 114 detects no belt 28 on the supporting plate 95, all solenoids 84 to 88 are actuated to raise the claws 89 to 93, and then the cylinder 100 is actuated to retract its cylinder rod 101, so as to withdraw the slide base 81 toward the supporting plate 95. The belts 28 are shifted by the claws 89 to 93 and, at the ends of travels by these claws, the solenoids 84 to 88 are energized to lower the claws 89 to 93 beneath the guiding surfaces of the rails 75, 77. Then, the cylinder 100 is reversed to extend its cylinder rod 101, thereby to reset the slide base 81. Similar operations are repeated. Namely, when the absence of the belt 28 is detected by the tenth sensor 113, belts are shifted by the claws 89 to 92. Similarly, the belts are shifted by claws 89 to 91, by the claws 89, 90 and by the claw 89, when the absence of the belt 28 is detected by the nineth sensor 112, eighth sensor 111 and sixth sensor 109, respectively, so that belts 28 may be stored at the eighth, ninth and eleventh sensors 111, 112 and 114, respectively.

As the absence of the belt 28 is detected by the fifth sensor 108, the motor 63 of the aforementioned shifting means 35 is started to cause the belt 28 positioned at the discharging side end of the shaft 66 to drop off from the latter. As the seventh sensor 110 detects a twist of the belt 28, the cylinder 105 is actuated to extend its cylinder rod 106, so that the claw 107 secured to the end of the cylinder rod 106 comes to engage the belt 28, thereby to force the belt 28 out through the notches 76, 72 of the rail 77 and the frame 73. The supplying means 33, separating means 34, chuck 37, pick-and-place unit 38 and the conveying means 39 have the same constructions as those of the first embodiment and, therefore, are not detailed here.

In operation, the belts 28, fed into the hopper 41 through the upper end opening of the latter, are stacked on the chute 43 disposed at the lower end of the hopper 41. As the vibrator 45 is energized by the signal delivered from the second sensor 59, the chute is vibrated to cause the belts 28 to slide along the bottom wall 49 of the chute 43 into the drum 53. The belts 28 thus fed into the drum 53 are stacked on the bottom of the drum 53. Then, the vibrator 45 is stopped, upon receipt of the signal from the third sensor 60, so as to stop the belt supply. The drum 53 is being rotated by the motor 56, through gears 55, 54, so that one or several belts 28 are separated from the stack of belts by successive pins 52 formed on the inner periphery of the drum 53, and are lifted by the successive pins 52 to an upper portion of the drum 53. Then, the belt 28 having been conveyed to the upper position of the drum 53 comes to be retained at its lower end by the receiving side end of the shaft 66 projected into the passage of the belt 28 and rotating in the same direction as the drum 53. As the pin 52 descends, due to the further rotation of the drum 53, the opening or gap between the inner peripheral wall of the drum and the end of the pin 52 comes to be directed downward, so that the upper end of the belt 28 is released from the pin 52 and transferred to the receiving side end of the shaft 66. No tension is caused in the belt 28 during the transfer, because the shaft 66 is rotated in the same direction as the drum at a speed slightly higher than that of the latter.

The belt 28, which has happened to fail to be arrested by the shaft 66 is dropped off from the pin 52 and falls onto the stack of the belt in the drum 53. The belt 28, which has been transferred to the receiving side end of the shaft 66, is then slid into the spiral groove 65 of the shaft 66, and shifted along the groove 65 to the discharging side end of the shaft 66 in accordance with the rotation of the latter. It will be seen that the belts 28 are received by the groove 65 one by one, partly because the groove is so dimensioned so as to receive only one belt 28 and partly because the shaft 66 is so inclined as to position its discharge side end higher than the receiving side end. Namely, even when more than two belts 28 are received by the shaft simultaneously, only one of them is allowed to get into the first turn of the spiral groove 65 while the other one is made to get into successive turns of the same.

The arrival of the belt 28 at the discharging side end of the shaft 66 is detected by the fourth sensor 67, upon which the motors 56 and 63 are stopped to stop the rotations of the drum 63 and the shaft 66. If no belt 28 on the claw 89 has been detected by the fifth sensor 108 of the twisted-belt ejecting means 36, the output from the fifth sensor 108 again starts the motors 56 and 63, so that the new belt 28 at the discharging side end of the shaft 66 is allowed to drop from the latter, due to the gravity. The dropped belt 28 is then caught by the claw 89 projecting into the belt 28. The belt 28 retained by the claw 89 is detected by the fifth sensor 108. If the next belt 28 arriving at the discharging side end of the shaft 66 is detected by the fourth sensor 67 in this state, the motors 56 and 63 are again stopped by the output from the sensor 67, so that the drum 53 and the shaft 66 are stopped.

Meanwhile, in the twisted-belt ejecting means 36, after the belt 28 has been sensed by the fifth sensor 108, the presence or absence of the belt 28 is sensed by the eleventh sensor 114. As the absence of the belt 28 is detected by the eleventh sensor 114, the solenoids 84 to 88 are energized to project the claws 89 to 93 from the guiding surfaces of the rails 75, 77. Then, the cylinder 100 is actuated to retract the cylinder rod 101 into the cylinder 100.

Consequently, the slide base 81 is moved, through the connecting plate 102 and the supporting fixture 103, toward the supporting plate 95, so that the claws 89 to 93 are moved toward the supporting plate 95, thereby to transfer the belt 28 toward the supporting plate 95, along the guiding surfaces of the rails 75, 77, by the claws 89 to 93. As the claws 89 to 93 arrive at the shifting end of the supporting plate 95, the aforementioned solenoids 84 to 88 are energized to retract the claws 89 to 93 from the guiding surfaces of the rails 75, 77. Then, the cylinder 100 is reversed to extend the cylinder rod 101, thereby to reset the slide base 81. The belt 28 retained by the claw 89 is lifted by the latter up to the guiding surfaces of the rails 75, 77, and is detected by the sixth sensor 109. The belt 28 is continually fed on the guiding surfaces of the rails 75, 77, and then is detected by the eighth sensor 111.

Simultaneously with the detection of the belt 28 by the sensor 111, the belt 28 is examined by the seventh sensor 110 for the presence of any twisting. This examination for the presence of twisting is carried out when the belt 28 has a rectangular cross-section.

Namely, in case of the belt 28 having a rectangular cross-section, the height of the top edge of the belt from the guiding surface of the rails 75, 77 becomes irregular, when the belt is raised to the level of the guiding surface, i.e. the height of the edge of the belt is lower at the twisted portion than at other portions of the belt 28, so as to allow the light emitted from the light emitting device 110a of the seventh sensor 110 is allowed to reach the light receiving device 110b of the same. Provided that there is no twist in the belt, the height of the edge of the belt from the guiding surface is uniform, so that the light emitted from the light emitting device is interrupted by the belt and, therefore, cannot reach the light receiving device 110b.

Consequently, the belt 28 detected by the eighth sensor 111 is judged to be in the twisted condition, if the light from the light emitting device 110a is received by the light receiving device 110b of the seventh sensor 110. To the contrary, the belt detected by the eighth sensor 111 is judged not twisted, when the light from the light emitting device 110a is not received by the light receiving device 110b of the seventh sensor 110.

After examining the presence of twist in the described manner, the system is stationed for the subsequent shifting order, when no twist of belt 28 is detected. However, when the belt 28 is found twisted, the cylinder 105 is actuated to extend the cylinder rod 106 from the cylinder 105, so as to advance the claw 107, thereby to retain the belt 28 by the claw 107. The claw 107 then ejects the belt 28, out of the twisted-belt ejecting means 36, through the notches 76 and 72 of the rail 77 and the frame 73.

Then, the cylinder 105 is reversed to retract the cylinder rod 106, so as to reset the claw 107.

Then, the cylinder 105 is reversed to retract the cylinder rod 106, so as to reset the claw 107. Meanwhile, as the belt 28 has been lifted up to the guiding surface of the rails 75, 77 by the claw 89, the fifth sensor 108 detects the leaving of the belt 28. After an elapse of a time since the detection of the leaving of the belt 28 by the fifth sensor 108 until the resetting of the claw 89, the output from the fifth sensor 108 then acts to start the motors 56 and 63, so as to drop the belt 28 stationed at the discharging end of the shaft 66 to drop therefrom. The belt 28 is then retained by the claw 89.

When no belt has not arrived at the supporting plate 95, i.e. when the absence of the belt 28 is sensed by the eleventh sensor 114, even after the above stated operation, the operation is repeated after the presence of the belt 28 is detected by the fifth sensor 108 subsequent to the ejecting operation.

When the belt safely arrives at the supporting plate 95, the arrival is detected by the eleventh sensor 114. When the eleventh and fifth sensors 114 and 108 detects the belts 28, while the tenth sensor 110 detects no belt 28, the solenoids 84 to 87 are energized to repeat the described operation, until the tenth sensor 113 comes to detect the belt 28. When the eleventh, tenth and fifth sensors 114, 113 and 108 detect the belts 28, while the ninth sensor 112 does not, the solenoids 84 to 86 are energized to repeat the above stated operation until the ninth sensor 112 comes to detect the belt 28. Further, when the eleventh, tenth, ninth and fifth sensors 114, 113, 112 and 108 detect the belts 28 while the eighth sensor 111 does not, the solenoids 84, 85 are energized to repeat the same operation until the eighth sensor 111 comes to detect the belt 28. Still further, when the eleventh to eighth sensors 114 to 111, as well as the fifth sensor 108, detect the belts 28 while the sixth sensor 109 does not, the solenoid 84 is solely energized by repeat the operation until the sixth sensor 109 comes to detect the belt 28.

Meanwhile, as the eleventh sensor 114 detects the arrival of the belt 28, the cylinder 167 of the pick-and-place unit 38 is actuated to lower the chuck 37, which is carried by the adapter plate 170 and has been stationed at a position above the supporting plate 95, until the claws 141, 142, 144 of the chuck 37 comes into contact with the supporting plate 95. As these claws 141, 142, 144 of the chuck 37 has come into contact with the supporting plate, the cylinder 147 is started to extend its cylinder rod 147, so as to move the slider 132 through the fixing plate 150 toward the rotary arm 124. As a result of the movement of the slider 132, the rocking arms 122, 123 are rotated, through the levers 128, 129, around respective pins 135, 135', in the direction to stretch the belt 28. Simultaneously, the pinion 145 is rotated through the rack 146 fixed to the slider 132, so as to rotate the rotary arm 124 in the direction to stretch the belt 28. Then, the rocking arms 122, 123 and the rotary arm 124 hold the belt 28, through their claws 141, 142 and 144, stretching the same radially outwardly. Since the claws 141, 142, 144 are carried by respective arms through respective bearings 140, 143, for free rotation, the belt 28 is held with an uniform tension over the entire circumference thereof.

As the belt 28 is held by the chuck 37, the cylinder 167 is reversed to lift the chuck 37 up to the position above the supporting plate 95. As the chuck 37 has been lifted up to the uppermost position in its vertical stroke, the cylinder 163 is actuated to move the chuck 37 to the position above the fitting position. Meanwhile, the article 27 to which the belt 28 is to be fitted has been conveyed along the guiding rail 171 of the conveying means 39, by the feeding claws, and has been stationed at the predetermined fitting position. As the chuck 37 reaches the position above the fitting position, the cylinder 147 is energized to lower the chuck 37, until the belt 28 held by the chuck 37 comes down to the level confronting the peripheries of the pulleys 29, 30 of the article 27. As the chuck 37 has arrived at the lowered position and stationed, the cylinder 147 of the chuck 37 is energized again to retract the cylinder rod 149, so as to pull back the slider 132 through the fixing plate 150. Consequently, the rocking arms 122 and 123 are swung toward the center of the belt 28, through the pair of levers 128, 129, while the rotary arm 144 is rotated also toward the center of the belt 28, through the rack 146 and pinion 145. Consequently, the claws 141, 142 and 144 are all concentrated to the space between the pulleys 29 and 30, so that the belt 28 comes to be retained by the peripheries of the pulleys 29, 30, i.e. the belt 28 is fitted around the article 27.

During this fitting, no excessive tension is applied to the belt 28, due to the rotatable nature of the claws 141, 142, 144, so that the belt 27 is fitted without being deformed.

After fitting of the belt 28 around the article 27, the cylinder 147 is reversed to raise the chuck 37 to the position above the fitting position. Subsequently, the cylinder 163 is actuated to retract the chuck 37 to the position above the supporting plate 95.

Meanwhile, the article 27 to which the belt 28 has been fitted is forwarded to the subsequent step of process, by the feeding claw 177 which is actuated through the fixture 174 and the slider 175 by the cylinder rod 173 of the cylinder 170.

The cylinder 172 retracts its cylinder rod 173, after having conveyed the article 27 by a predetermined distance, so as to reset the slider 175. During the returning movement of the slider, the feeding claws abutting the article 27 is depressed by the latter, against the biasing force of the spring 176, so as not to displace the article 27.

The belts 28 are successively fitted around the successive articles 27, as the described operation is performed repeatedly.

The foregoing description has been made as to the handling of belts having a rectangular cross-section. However, the described apparatus can be used for belts having a round cross-section. In the latter case, the twisted-belt ejecting means 36 cannot eject rejected belts and, therefore, acts merely as guide means for guiding the belts from the shifting end of the shifting means 35 to the supporting plate 95.

What is claimed is:

1. An apparatus for fitting a flexible annular part around an article comprising:
    (a) separating means including a rotary drum mounted for rotation about a horizontally positioned axis and having a plurality of pins formed on an inner peripheral wall of said drum, said pins being arranged in a row extending in a direction of rotation of said drum at a predetermined constant circumferential pitch, said pins being provided with projecting end portions spaced from said inner peripheral wall of said drum by a distance so as to receive only one flexible annular part, and means for rotating said rotary drum, so that said flexible annular parts are successively separated from a stack of parts at the bottom of said rotary drum one by one and picked up and moved up to an upper position in said rotary drum by the successive projecting end portions of the pins, as said drum is rotated by said means for rotating the drum, said flexible annular part being moved up to said upper position and then being dropped off from said pin as said pin passes a predetermined position at the upper portion of said drum as said drum is further rotated;

(b) guiding means for receiving said flexible annular part from said pin at a delivery position located at an upper position within said drum and for shifting said flexible annular part to a feeding position out of said drum;

(c) a chuck having a plurality of claws adapted to be located within the circle of said flexible annular part and to be moved to stretch said flexible annular part radially outwardly into a desired size and shape to thereby hold said flexible annular part, said chuck being adapted for stretching said flexible annular part at said fitting position, for placing said flexible annular part in alignment of parts of said article to which said flexible annular part is to be fitted, and for releasing said flexible annular part to transfer said annular part to said parts of said article which article is stationed at a predetermined fitting position; and (d) means for reciprocating said chuck between said feeding position and said fitting position.

2. An apparatus as claimed in claim 1, wherein said guiding means includes a receiving member having a claw mounted for reciprocation between said delivery position in said drum and said feeding position out of said drum, and means for reciprocating said claw of said receiving member, said receiving member being arranged so that the receiving member claw in said delivery position is located at the center of a flexible annular part picked up by one of said pins of said drum to receive and retain said flexible annular part on said receiving member claw when said annular part is dropped from the associated pin, and to subsequently shift the received flexible annular part to said feeding position.

3. An apparatus as claimed in claim 1, wherein said guiding means includes:

(a) shifting means having a shaft rotatably supported in the same direction as said drum and having a spiral groove on a peripheral surface thereof, the spiral groove having a width dimensioned so as to receive only one flexible annular part, and means for rotating said shaft, said shaft having one end projecting into a path of upward travel of said flexible annular part caused by the rotation of said drum, the one end of said shaft projects in such a manner that at least a lower end of said flexible annular part is retained by a portion of said shaft disposed below a center thereof, and disposed at such an inclination that a discharge end of the shaft is positioned higher than a receiving end of the shaft, whereby the flexible annular parts dropped from said pin are received at said delivery position by the receiving end of said shaft and shifted along said spiral groove, as said shaft is rotated, to said discharge end of said shaft, during which entangled or overlapped flexible annular parts are separated into independent pieces and discharge from said discharge end successively one by one;

(b) a receiving member having a claw mounted for reciprocation between said discharge end of said shaft and said feeding position, said receiving member being adapted to place the receiving member claw into said flexible annular part arriving at said discharge end of said shaft and, as said shaft is rotated, to discharge said flexible annular part, to receive said flexible annular part and convey the same to said feeding position; and (c) means for reciprocating said receiving member between said discharge end of said shaft and said feeding position.

4. An apparatus as claimed in claim 1, wherein said guiding means includes:

(a) shifting means having a shaft rotatably supported in the same direction as said drum and having a spiral groove on a peripheral surface thereof, the spiral groove having a width dimensioned so as to receive only one flexible annular part, and means for rotating said shaft, said shaft having one end which projects into a path of upward travel of said flexible annular parts effected by the rotation of said drum, said one end of said shaft projecting in such a manner that at least a lower end of said flexible annular part is retained by a portion of said shaft below a center thereof, and disposed at such an inclination that a discharge end of said shaft is positioned higher than a receiving end of the shaft, whereby the flexible annular parts dropped from said pin are received at said delivery position by the receiving end of said shaft and shifted along said spiral groove, as said shaft is rotated, to the discharge end of said shaft, during which entangled or overlapped flexible parts are separated into independent pieces and discharged from said discharge end successively one by one;

(b) a pair of rails disposed to confront each other at a predetermined position between the discharge end of the shaft and the feeding position; and (c) a receiving member having a plurality of claws disposed in a row at a predetermined pitch between said rails, said receiving member claws being adapted to be moved upward so as to project above said rails at the end of their stroke closer to said shaft, so as to retain and shift successive flexible annular parts to said feeding position as they move to said feeding position, and to be moved below said rails as they arrive at the end of the stroke closer to said feeding position, wherein the arrangement is such that one of the receiving member claws brought to the end of said stroke closer to said shaft is placed into said flexible annular part arriving at said discharge end of said shaft and, thereafter, said flexible annular part is delivered from said shaft to said receiving member claw upon rotation of said shaft, said receiving member claw is then raised and moved to said feeding position to lift said flexible annular part up to the level of said rails, while the flexible annular parts already positioned on said rails are successively shifted to said feeding position, intermittently by one pitch movements of said claws.

5. An apparatus as claimed in claim 4, wherein said guiding means further includes a twisted flexible annular part ejecting means having a sensor comprising a light emitting device and a light receiving device oppositely disposed on said rails so as to confront each other, and a claw mounted for sliding motion across the path of travel of said flexible annular parts on said rails, whereby a twisted flexible annular part detected by said sensor is ejected out of said rails by slidingly moving said guiding means so as to make such claw retain said twisted flexible annular part.

6. An apparatus as claimed in claim 1, wherein said guiding means includes:
 (a) a pair of spaced oppositely disposed rails;
 (b) a plurality of claws arranged in a row in the space between said rails, said claws being displaceably mounted and adapted to project to a level of said rails when the claws are returned to an end of a displacement stroke closer to said shaft, so as to convey said flexible annular parts to the other end of the displacement stroke closer to said feeding position during a travel of the claws to the other end of the displacement stroke and to move below said rails as the claws arrive at said other end of the displacement stroke and, thereafter, to return to said end of stroke closer to said shaft along a path defined beneath the level of said rails, said claws being mounted so as to permit projecting and sinking movements of the claws independently of each other;
 (c) a plurality of sensors associated with respective claws, each of said sensors having a light emitting device and a light receiving device oppositely disposed on said rails so as to confront each other whereby, when a twisted flexible annular part has been ejected by an ejecting means during an intermittent shifting of an annular part toward said feeding position so as to cause a discontinuity in a row of said flexible annular parts, a vacancy of a position which had been occupied by the ejected flexible annular part is detected by one of said sensors so as to feed subsequent flexible annular parts to fill the position thereby making a continuous row of flexible annular parts;
 (d) another sensor having a light emitting device and a light receiving device confronting each other across said rails of said guide means; and
 (e) an additional claw mounted for sliding motion across the path of travel of said flexible annular parts on said rails whereby, if a twisted flexible annular part is detected by said another sensor, said additional claw slides across said path of travel to retain and force out said twisted flexible annular part.

* * * * *